United States Patent
Bertran et al.

(10) Patent No.: US 10,642,342 B2
(45) Date of Patent: *May 5, 2020

(54) PREDICTING VOLTAGE GUARDBAND AND OPERATING AT A SAFE LIMIT

(71) Applicant: INTERNATIONAL BUSINESS MACHINES CORPORATION, Armonk, NY (US)

(72) Inventors: Ramon Bertran, Bertran, NY (US); Pradip Bose, Yorktown Heights, NY (US); Alper Buyuktosunoglu, White Plains, NY (US); Jingwen Leng, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,373

(22) Filed: Aug. 22, 2018

(65) Prior Publication Data

US 2019/0011977 A1 Jan. 10, 2019

Related U.S. Application Data

(63) Continuation of application No. 14/949,500, filed on Nov. 23, 2015, now Pat. No. 10,114,449.

(51) Int. Cl.
  *G06F 1/3296* (2019.01)
  *G06F 1/3206* (2019.01)

(52) U.S. Cl.
  CPC .......... *G06F 1/3296* (2013.01); *G06F 1/3206* (2013.01); *Y02D 10/172* (2018.01)

(58) Field of Classification Search
  CPC .... G06F 1/3206; G06F 1/3296; Y02D 10/172
  See application file for complete search history.

(56) References Cited

U.S. PATENT DOCUMENTS

| | | | |
|---|---|---|---|
| 10,114,449 B2 * | 10/2018 | Bertran | G06F 1/3206 |
| 2012/0324250 A1 * | 12/2012 | Chakraborty | G06F 1/206 |
| | | | 713/300 |
| 2013/0290751 A1 * | 10/2013 | Mondal | G06F 1/3206 |
| | | | 713/320 |

FOREIGN PATENT DOCUMENTS

| | | |
|---|---|---|
| EP | 2887181 | 6/2015 |
| GB | 2513330 | 10/2014 |
| WO | 2013101225 | 7/2013 |

OTHER PUBLICATIONS

List of IBM Patents or Patent Applications Treated as Related dated Aug. 22, 2018, 2 pages.

(Continued)

*Primary Examiner* — Terrell S Johnson
(74) *Attorney, Agent, or Firm* — Tutunjian & Bitetto, P.C.; Kevin Michael Jordan

(57) ABSTRACT

Methods and systems for executing an application includes executing an epoch of the application using a predicted minimum operational voltage that is based on a previous epoch of the application if the application is in a stable phase and using a nominal safe voltage if the application is in an unstable phase.

17 Claims, 7 Drawing Sheets

(56) References Cited

OTHER PUBLICATIONS

Xing Hu et al., Orchestrator: Guarding Against Voltage Emergencies in Multithreaded Applications, IEEE Transactions on very large scale integration (VLSI) systems, vol. 22, No. 12, Feb. 6, 2014.
Amin Ansari, Tangle: Route-Orientated Dynamic Voltage Minimization for Variation-Afflicted, Energy-Efficient On-Chip Networks, High Performance Computer Architecture (HPCA), 2014 IEEE 20th International Symposium, Feb. 15-19, 2014.

* cited by examiner

PREDICTING VOLTAGE GUARDBAND AND OPERATING AT A SAFE LIMIT

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights to this invention.

BACKGROUND

Technical Field

The present invention relates to safely reducing wasted energy and, more particularly, to safely optimizing chip operating voltage.

Description of the Related Art

Integrated circuit components generally need a certain voltage level to operate correctly and safely. However, due to process, voltage, and temperature variations, this threshold voltage can change from chip to chip and even from component to component within a single chip. As such, traditional processor design uses a static voltage guardband to ensure safe operation.

However, the static guardband approach wastes energy because the guardband is selected to accommodate the worst case circumstances—a rare event. There are a variety of solutions to this problem in the art. In a first solution, the operating voltage is dynamically adjusted to overcome variations by detecting the available timing margin with a critical path monitor. In a second solution, the clock cycle is adaptively tuned according to a supply voltage value. In a third solution, an on-die power supply monitor circuit is used to monitor voltage droop events and increase the clock cycle upon detecting a voltage droop. In fourth solution, a tunable replica circuit at the root of clock distribution is used to detect the available timing margin and to adjust the voltage dynamically. In a fifth solution, a program signature and microarchitectural events are used to predict a large voltage droop.

However, all of these solutions reactively adjust the voltage during program execution and many use specialized circuits.

SUMMARY

A method for executing an application includes executing an epoch of the application using a predicted minimum operational voltage that is based on a previous epoch of the application if the application is in a stable phase and using a nominal safe voltage if the application is in an unstable phase.

A system for executing a program includes a processor configured to execute an application, broken up into a plurality of epochs, at an operating voltage. A firmware/runtime is configured to set the operating voltage of the microprocessor to be a predicted minimum operational voltage for execution of an epoch of the application that is based on a previous epoch of the application if the application is in a stable phase, and to set the operating voltage of the microprocessor to be a nominal safe voltage for execution of the epoch of the application if the application is in an unstable phase.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention employ microarchitectural performance counters to proactively predict the minimal working voltage (Vmin) before and during program execution. In one specific embodiment, a graphics processing unit (GPU) is used to execute software that is made up of multiple kernels, but it should be recognized that the present embodiments are not limited to GPUs and may be applied to conventional processors as well. The measured maximum Vmin value of kernels in the program matches the measured Vmin of the whole program, indicating that the activities of individual kernels decide the Vmin of the kernel and of the program. Activities performed during kernel execution—rather than during the initial start-up period of the program—are generally the cause of the high Vmin of the kernel.

This makes it possible to use the kernel's microarchitectural performance counters to predict the Vmin of the kernel—most modern microprocessors expose access to the performance counters, which are a good indicator of microprocessor activity, which determines the Vmin of a program. A prediction model is trained offline with a set of representative programs and then deployed online for use in prediction after training.

Figure 1:
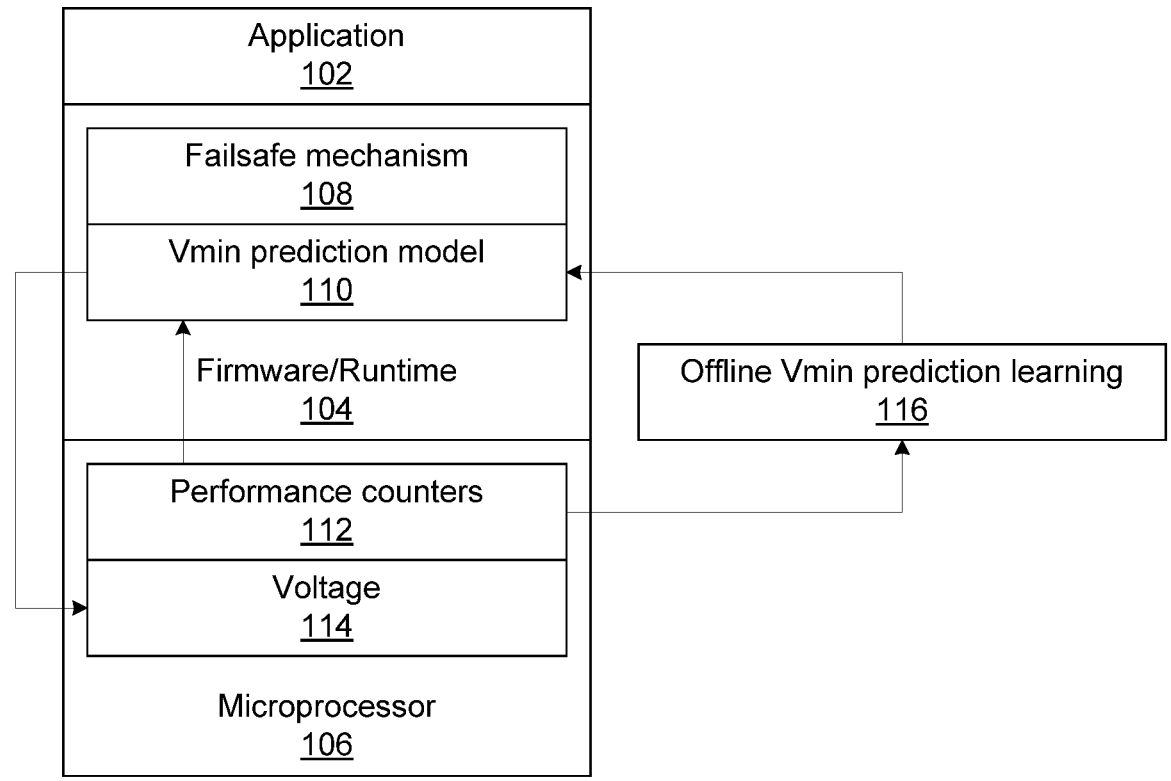
FIG. 1 is a block diagram illustrating a system for executing an application in accordance with the present principles.

Referring now to the drawings in which like numerals represent the same or similar elements and initially to FIG. 1, a diagram of a system for predicting the Vmin of an application 102 running on a microprocessor 106 is shown. Voltage prediction is implemented at a firmware layer 104, which avoids modification of the program (which may, in the general case, be any piece of software) and the hardware. The microprocessor 106 operates at a voltage level 114, which is controlled by the firmware layer 104. It should be noted that, although the present embodiments are described as having firmware layer 104 in control, the present principles may alternatively be implemented using a software runtime.

Firmware layer 104 operates in units of "epochs," which may be a certain number of processor cycles, a number of executed instructions, loop counts, or function counts. The firmware layer 104 includes an offline trained Vmin prediction model 110 to control the voltage 114 of the microprocessor 106. The microprocessor 106 records performance counters 112 for each epoch and the firmware 114 accesses those performance counters at the end of the respective epoch. The performance counters 112 are hardware features that include a set of counters recording microprocessor activities such as, e.g., instructions per cycle and number of cache misses. It should be noted that the Vmin prediction model can be based on a number of different prediction schemes. In particular, the present disclosure describes a first embodiment based on time epochs and a second embodiment based on program functions. In the latter embodiment, it is specifically contemplated that the functions of the firmware layer 104 described above may be performed by a software runtime, because such a software runtime will have access to functional information at the application 102 that the firmware 114 would not have access to. As such, embodiments based on time-based epochs are described below with respect to a firmware layer 104, whereas embodiments based on function-based epochs are described below with respect to a software runtime.

Offline Vmin prediction training 116 is performed before a given application 102 is performed based on the previous execution of representative programs. The offline training 116 uses information about performance counters 112 from previous executions to generate the Vmin prediction model 110 that is used in the firmware 110 to control the voltage 114.

During operation with a predicted Vmin, failsafe mechanism 108 guarantees reliable execution even in the rare event of prediction failure, when the microprocessor 106 runs below its minimum voltage. One exemplary implementation of failsafe mechanism 108 is error detection and recovery, which either directly detects an anomaly or compares performance counters 112 from a current epoch against performance counters 112 from a previous epoch. If there is a large mismatch in the performance counters 112 between the two epochs, the program may be in a phase change or there may be a timing error. Once the error is detected, the firmware 104 restarts the epoch from a previous checkpoint or re-executes the entire program. Another exemplary implementation detects the pre-leading symptom of the error and prevents the occurrence of the error. In one example, a critical path monitor may be used to detect the timing margin and stretch the clock to prevent the error from occurring. The firmware 104 may retrain the model by updating the training data to reflect the error in the present epoch, thereby updating the prediction model before the execution of the next program.

Figure 2:
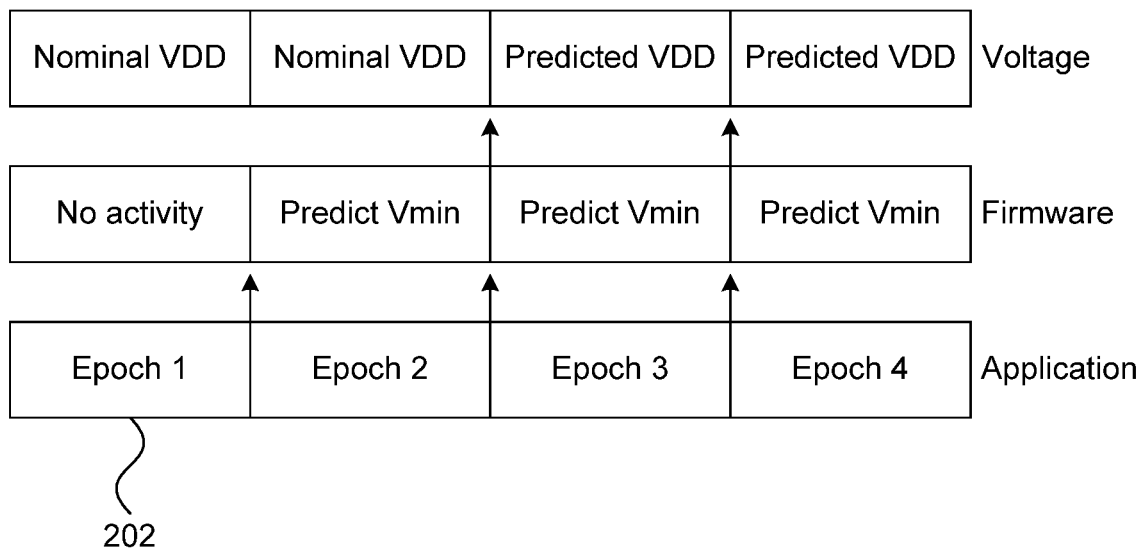
FIG. 2 is a diagram illustrating a timeline for minimum voltage prediction in accordance with the present principles.

Referring now to FIG. 2, a timeline of operation is shown, split into time-based epochs 202. At epoch 1, the microprocessor 106 runs at a nominal voltage (VDD) level. This nominal level reflects either a known-safe level, without prediction, as the system has not yet had time to collect information regarding the application 102 that it might use to form such a prediction. As such, the firmware 104 performs no predictions of Vmin during epoch 1.

At the end of the first epoch, information regarding the execution of the application 102 on the microprocessor 106 is sent to the firmware 104 and, in particular, the Vmin prediction model 110. The firmware 104 uses the offline-trained model 110 to make a prediction for Vmin based on the performance counters 112 from the first epoch during epoch 2. The firmware 104 can use one of a set of different prediction schemes to generate the prediction. At this point, no prediction has yet reached the microprocessor 106, so the microprocessor 106 continues to operate at nominal VDD during epoch 2.

At the end of the second epoch, the most recent performance counters are sent to the firmware 104 and the firmware's first Vmin prediction is sent to the microprocessor 106 to set the voltage 114. As such, during epoch 3 and each subsequent epoch, the firmware 104 makes a new prediction while the microprocessor 106 runs the application 102 at the most recent predicted Vmin. If a newly predicted Vmin is different from the last predicted Vmin, then the firmware 104 determines that the application 102 is not in a stable phase. Instead of using a single epoch to predict the Vmin of the next epoch, the firmware combines performance counters of multiple epochs to predict the Vmin(s) for the next set of epochs.

Figure 3:
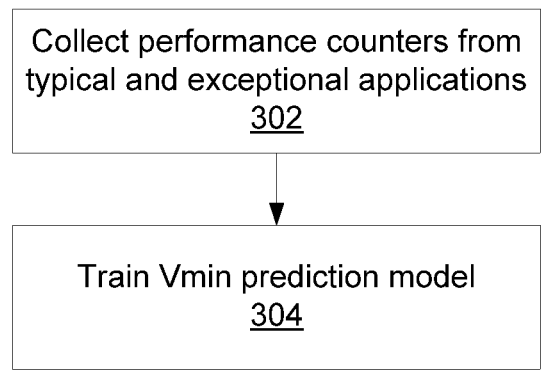
FIG. 3 is a block/flow diagram of a method for training a minimum voltage prediction model in accordance with the present principles.

Referring now to FIG. 3, an offline training method for training a minimum voltage prediction model is shown. Block 302 collects performance counters from a variety of applications 102, including applications 102 that represent typical use cases and applications 102 that are atypical. A "typical" application may be a standard test application supplied by a vendor, a dedicated microbenchmark that the vendor generates for model training or functionality testing, or a frequently executed application supplied by the customer/user. Block 304 then trains the Vmin prediction model 110 offline. Any appropriate training method may be used, including for example using linear regression and neural network modeling.

Figure 4:
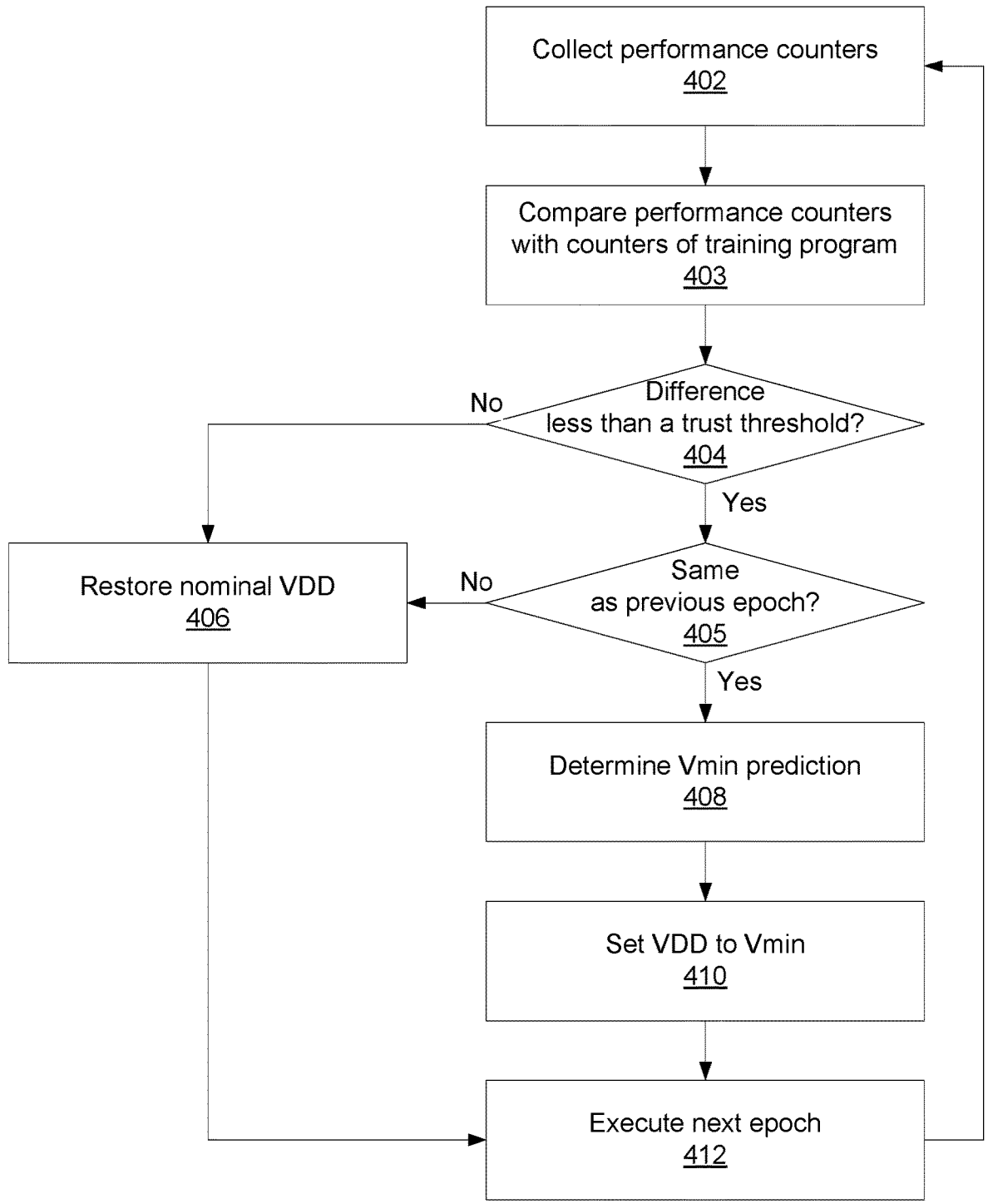
FIG. 4 is a block/flow diagram of a method for executing an application in accordance with the present principles.

Referring now to FIG. 4, a conservative prediction method for time-based epochs is shown. Block 402 collects performance counters 112. A two-step determination is used to assess whether to use the Vmin prediction model. Block 403 compares whether the performance counters 112 are within bounds established during training (i.e., whether the difference between the performance counters and counters of the training program(s) are less than a trust threshold). If the performance counters 112 are not within the trained bounds at block 404, the prediction model 110 is not trusted for this epoch and block 406 restores the nominal VDD and block 412 executes the next epoch.

Block 405 determines whether the performance counters 112 are the same as from the previous epoch. Block 405 judges whether the values are the "same" by comparing the features and determining whether the difference exceeds a predetermined threshold. This threshold can be determined empirically or by any appropriate method. If the performance counters are different between the two epochs, the conservative method determines that the prediction model is not reliable for this epoch and block 406 restores the nominal VDD and block 412 executes the next epoch.

If the performance counters are sufficiently close, block 408 determines a prediction for Vmin. Block 408 feeds the performance counters into a function or trained neural network, and the output of the function or network represents the predicted Vmin for the next epoch. Block 410 then sets the predicted voltage and block 412 executes the next epoch.

Figure 5:
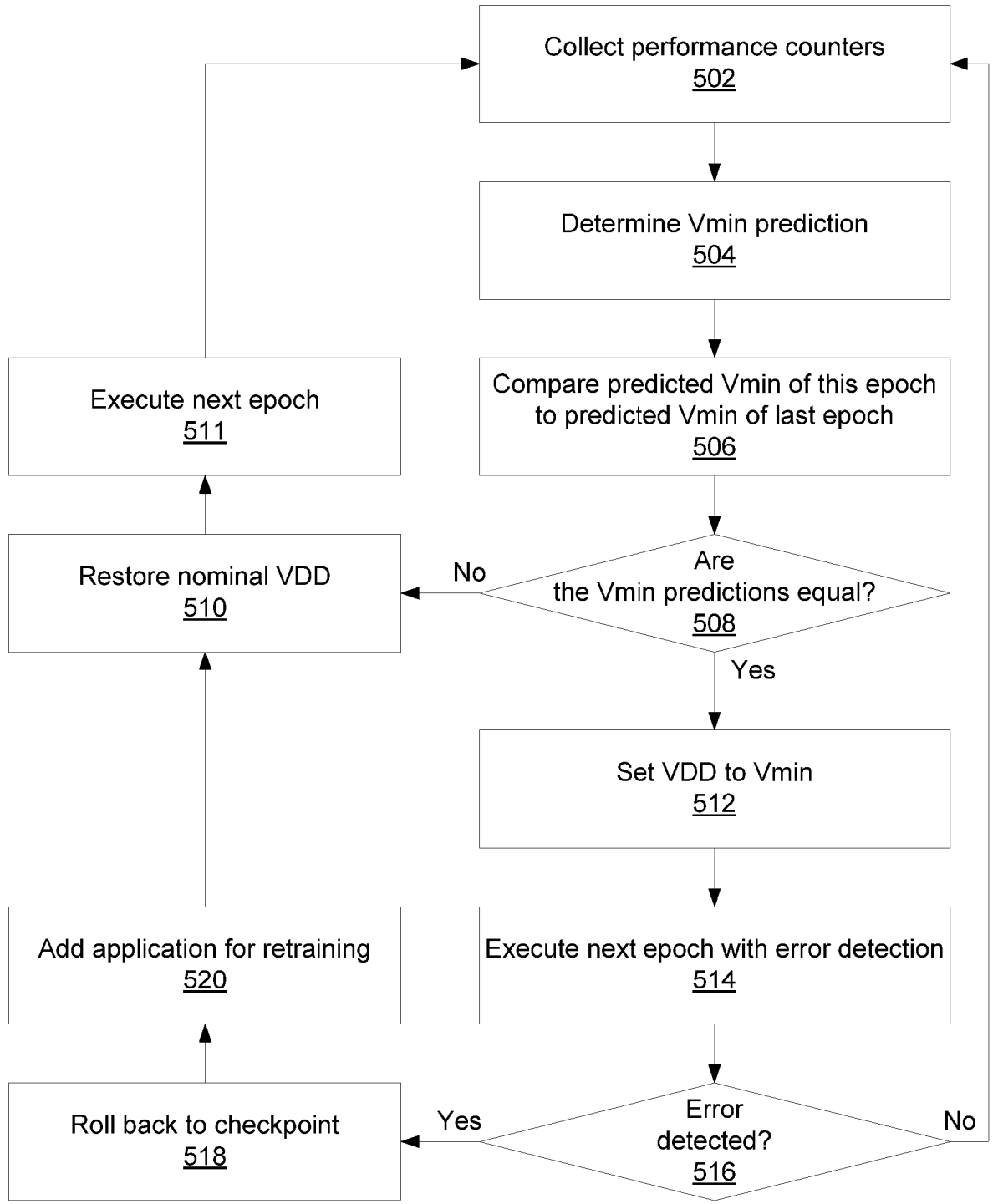
FIG. 5 is a block/flow diagram of a method for executing an application in accordance with the present principles.

Referring now to FIG. 5, an aggressive prediction method for is shown for time epoch prediction. Block 502 collects performance counters and block 504 determines a prediction for Vmin. Block 504 feeds the performance counters into a function or trained neural network, and the output of the function or network represents the predicted Vmin for the next epoch. Once the new Vmin prediction has been determined, block 506 compares the new prediction to the Vmin that was predicted for the previous epoch. If the two predictions are not "equal" (e.g., if they differ by more than a predetermined threshold), then block 510 restores the nominal VDD and block 511 executes the next epoch with nominal VDD. This condition represents a period of time when the prediction is not reliable, for example when the application 102 is changing from one state to another. Notably, the comparison of block 506 proceeds even if the previous prediction was not used—this allows a return to Vmin prediction after stability resumes.

If the two predictions are equal, then block 512 sets VDD to the newly predicted Vmin and block 514 executes the next epoch with error detection. Block 516 determines whether an error was detected. If no error was detected, processing returns to block 502 to collect performance counters and prepare for another epoch. If errors were detected, then block 518 rolls the application 102 back to a previous checkpoint and block 520 marks the application 102 for retraining. Block 510 then restores the nominal VDD and block 511 executes the next epoch with nominal VDD before returning processing to block 502.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 6:
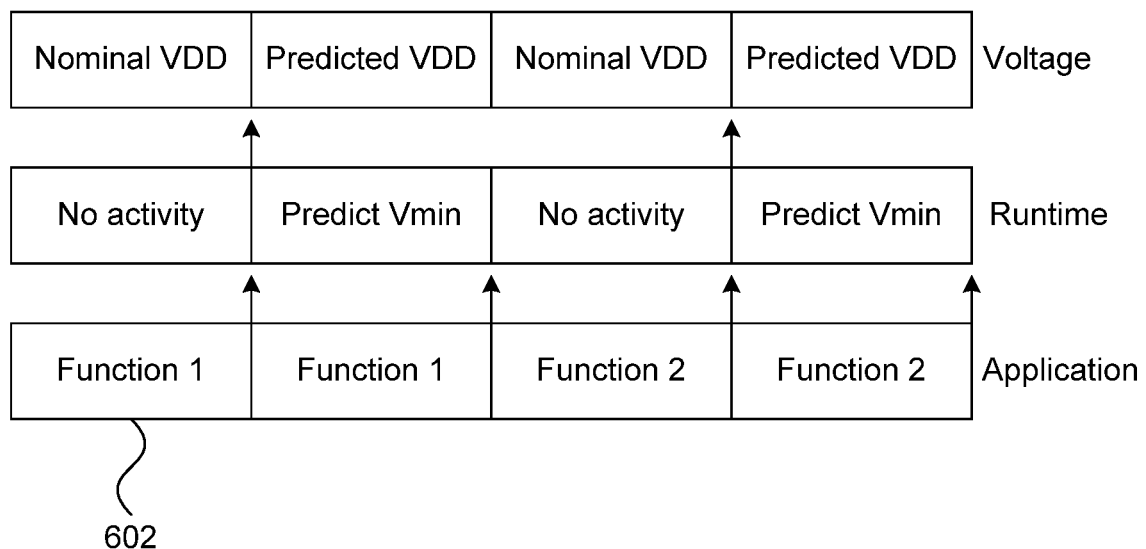
FIG. 6 is a diagram illustrating a timeline for minimum voltage prediction in accordance with the present principles.

Referring now to FIG. 6, a timeline of operation is shown, split into function-based epochs 602. In this embodiment, the application 102 performs a first function some number of times before switching to a second function. As compared to the embodiment of FIG. 2, the firmware layer is replaced with a software runtime layer 104 that can track the functions being executed by the application 102. When a new function is executed by the application 102, the runtime 104 predicts a new Vmin, which is used to set a voltage level for the duration of the epoch.

At the Epoch 1, application 102 executes the Function 1 for the first time, so the runtime 104 has no record of its performance counters to make the Vmin prediction. As such, the voltage remains the nominal voltage. At the end of the first epoch, information regarding the execution of the application 102 on the microprocessor 106 is sent to the runtime 104 and, in particular, the Vmin prediction model 110. The runtime 104 uses the offline-trained model 110 to make a prediction for Vmin based on the performance counters 112 from the first epoch during epoch 2. The runtime 104 can use one of a set of different prediction schemes to generate the prediction. At this point, the microprocessor 106 can use the performance counters of Function 1 to perform Vmin prediction to operate future epoch that executes Function 1 again.

At the beginning of epoch 2, Function 1 is about to execute on the microprocessor 106. The runtime already has the Vmin prediction from epoch 1. Thus, the microprocessor 106 runs at the predicted voltage in this epoch. At the end of epoch 2, the runtime can update the performance record for Function 1 such as by calculating the averaged performance value.

At the starting of epoch 3, Function 2 is executed for the first time. The runtime 104 does not have a performance counter record for Function 2 yet, and thus the microprocessor 106 runs at the nominal VDD. At the starting of epoch 4, Function 2 is about to execute again on the microprocessor 106. The runtime 104 already has the Vmin prediction from epoch 3. Thus, the microprocessor 106 runs at the predicted voltage in this epoch. At the end of epoch 4, the runtime 104 can update performance record for Function 2.

Figure 7:
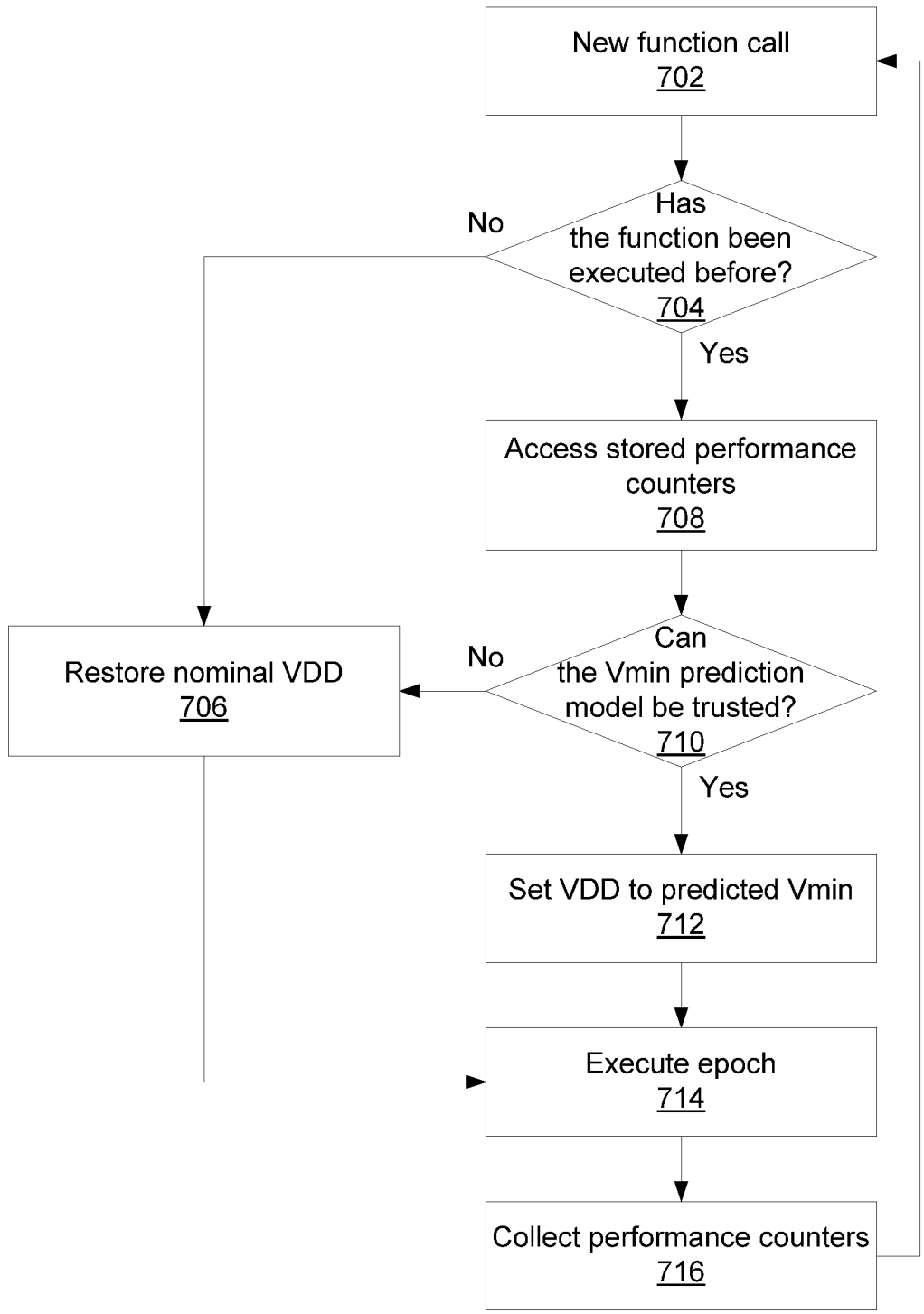
FIG. 7 is a block/flow diagram of a method for executing an application in accordance with the present principles.

Referring now to FIG. 7, a conservative prediction method for function-based epochs is shown. Block 702 starts a new function call and, hence, a new epoch. Block 704 determines whether the function has been executed before. If not, then no performance counter information is available and block 706 sets the voltage VDD to the nominal VDD. If so, block 708 accesses the stored performance counters from the previous execution of the function.

Block 710 determines whether the Vmin prediction model can be trusted based on a comparison of the stored performance counters to the training counters. If the two sets of counters are outside of a threshold range of one another, the model cannot be trusted and block 706 restores the nominal VDD. If the model can be trusted, block 712 sets VDD to be the predicted Vmin based on the Vmin prediction model. Block 714 then executes the epoch using voltage set as VDD and block 716 collects and stores performance counters for the function.

Figure 8:
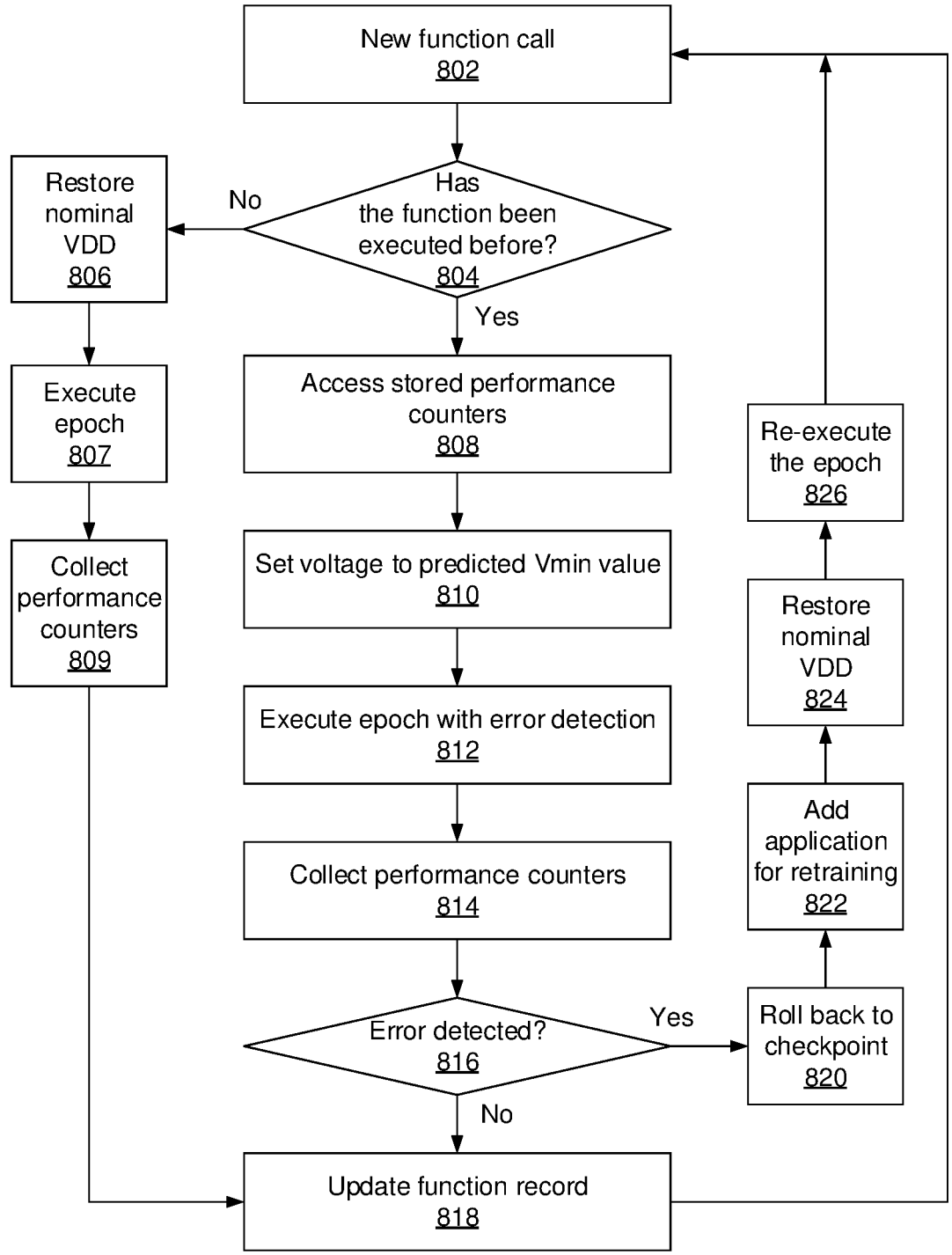
FIG. 8 is a block/flow diagram of a method for executing an application in accordance with the present principles.

Referring now to FIG. 8, an aggressive prediction method for function-based epochs is shown. Block 802 begins a new function call and, hence, a new epoch. Block 804 determines whether the function has been executed before. If not, then no performance counter information is available and block 806 restores the nominal VDD. Block 807 executes the epoch with the nominal VDD and block 809 collects performance counters 112. Block 818 then updates the function record based on the collected performance counters and block 802 beings a new function call.

If the function has been executed before, block 808 accesses stored performance counters and block 810 sets VDD to a predicted Vmin value based on the Vmin prediction model. Block 812 then executes the epoch with error detection and block 814 collects performance counters 112. Block 816 determines whether there was an error in execution of the epoch. If not, block 818 updates the function record and block 802 starts a new function call.

If an error was detected in block 816, block 820 rolls the application 102 back to a checkpoint and block 822 adds the application for retraining. Block 824 restores the nominal VDD and block 826 re-executes the epoch. Block 802 then begins a new function call.

In one alternative embodiment, the failsafe mechanism 108 may include a control loop that stretches the clock to prevent timing errors from happening, even in the case of Vmin prediction failure. In this case, there will be no need for rollback and re-execution of the epoch, as the failsafe mechanism 108 will automatically ensure proper execution of the function.

In one exemplary embodiment, the present principles may be applied to a GPU microprocessor 106 with a Compute Unified Device Architecture (CUDA) programming model. A CUDA application 102 includes multiple kernels, each of which is a function running on the GPU 106. In this example, the kernel is selected as the unit for the epochs, because the CPU has control before and after kernel execution. The performance of each kernel as the input for the Vmin prediction model 110 because the Vmin is determined by the worst-case voltage droop, which is further determined by the current surge or resonant current ramping pattern. In the CUDA programming model, there are four possible sources that may cause such a current pattern: CUDA runtime activity, inter-kernel activity, initial kernel launch activity, and intra-kernel activity. Intra-kernel activity is the main determiner of Vmin in the kernel and, hence, each kernel's performance counters are used to predict the Vmin.

In this example, the output of the prediction model 110 is the voltage savings level that corresponds to the Vmin point, representing the difference between the predicted Vmin and the nominal VDD (e.g., the voltage "saved" by predicting Vmin). As noted above, Vmin prediction can be performed using linear regression, neural networks, or other appropriate methods. In this example, three error metrics are used for determining the efficacy of the prediction model 110. The root mean square error (RMSE) is first calculated as a metric to indicate average prediction accuracy. The maximum over-prediction error is also calculated to determine whether the predicted voltage savings level is higher than the actual value that corresponds to the application's true Vmin point, where voltage reduction beyond that level may cause the application 102 to fail. The third error metric is the maximum under-prediction error, which shows that the predicted voltage savings level is lower than the actual value. In this case, the extra guardband is wasted because the program could have run at a lower voltage level.

The present example uses 28 performance counters, including the utilization level of different types of functional units, hit/miss rates of instruction, L1 data, texture and constant caches, and inter-process communication. There are 577 invocations of different kernels from the representative program suite. Thus, the input for regression is a 557×28 element matrix. Using linear regression in this case produces an RMSE value of only 2.2%, but over-predicts many kernels' voltage level by 7%, where the maximum was 10%. This necessitates additional guardband for safe execution. Maximum underprediction error is 10%, with a predicted undervolt level of 5% but an actual level of 15%, resulting in a 10% guardband wastage.

The neural network prediction provides a more accurate model 110. The training data is the same 557×28 element matrix, and a neural network with one hidden layer is used. The number of neurons in the input layer and the number of neurons in the hidden layer is 10. The neural network provides an RMSE value of 0.5%, with a maximum over-prediction error of only 3% and a maximum underprediction error of only 2%. In this case the neural network predictions outperform the linear regression, with fewer errors and less guardband wastage. This demonstrates that energy savings close to the ideal case (where the true Vmin is known for every epoch) by using the neural network prediction model 110. The neural network prediction model 110 is trained to predict each kernel's voltage savings level at its Vmin point.

Using these predictions, each application 102 is executed with the predicted voltage savings level. Since the maximum overprediction error is less than 3%, another 3% margin is added to the prediction to cover model prediction errors. The GPU's overall energy consumption may then be measured under three different scenarios: with nominal frequency and voltage, with nominal frequency and Vmin, and with normal frequency and predicted Vmin. A set of CUDA programs having long-running kernels are measured, with the GPU power being measured at the card level—thereby including power consumption of the microprocessor chip, memory, and peripherals. The energy saving is calculated by comparing the second scenario (i.e., where the true Vmin values are known) and the third scenario (using the predicted values) against the first scenario (the baseline).

In this example, energy savings depend on two factors, the amount of voltage that can be reduced and the percentage of microprocessor chip power consumed at the level of the card. Voltage reduction only impacts the microprocessor chip power consumption and does not affect the memory power consumption. Experiments performed pursuant to this exemplary embodiment have shown average energy savings between about 11.3% and about 23.2%, depending on the amount of power demanded by the memory, with an average energy saving of about 16.9%. This compares to energy savings of about 14% to about 25% that would be available if perfect foreknowledge of the true Vmin values were available.

Having described preferred embodiments of predicting voltage guardband and operating at a safe limit (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

The invention claimed is:

1. A method for executing an application, comprising:
   executing an epoch of the application using a predicted minimum operational voltage that is based on a previous epoch of the application if the application is in a stable phase and using a nominal safe voltage if the application is in an unstable phase.

2. The method of claim 1, further comprising determining whether the application is in a stable or unstable phase by comparing performance counters of the previous epoch to performance counters of an earlier epoch.

3. The method of claim 2, wherein determining whether the application is in a stable or unstable phase comprises determining that the application is in a stable phase if the performance counters of the previous epoch are within a threshold distance from the performance counters of the earlier epoch.

4. The method of claim 1, further comprising determining whether the application is in a stable or unstable phase by comparing the predicted minimum operational voltage for the epoch with a predicted minimum operational voltage for the previous epoch.

5. The method of claim 4, wherein determining whether the application is in a stable or unstable phase comprises determining that the application is in a stable phase if the predicted minimum operational voltage for the epoch is within a threshold distance from the predicted minimum operational voltage for the previous epoch.

6. The method of claim 1, wherein executing the epoch of the application comprises detecting errors in the execution that result from an undervoltage condition and re-executing the epoch using a nominal safe voltage if an error is detected from an undervoltage condition.

7. The method of claim 1, wherein the epoch is a time-based epoch triggered by a predetermined period of time.

8. The method of claim 1, wherein the epoch is a function-based epoch triggered by individual function calls.

9. A computer readable storage medium comprising a computer readable program for executing an application, wherein the computer readable program when executed on a computer causes the computer to perform the steps of:
executing an epoch of the application using a predicted minimum operational voltage that is based on a previous epoch of the application if the application is in a stable phase and using a nominal safe voltage if the application is in an unstable phase.

10. A system for executing a program, comprising:
a processor configured to execute an application, broken up into a plurality of epochs, at an operating voltage;
a firmware/runtime configured to set the operating voltage of the microprocessor to be a predicted minimum operational voltage for execution of an epoch of the application that is based on a previous epoch of the application if the application is in a stable phase, and to set the operating voltage of the microprocessor to be a nominal safe voltage for execution of the epoch of the application if the application is in an unstable phase.

11. The system of claim 10, wherein the firmware/runtime is further configured to determine whether the application is in a stable or unstable phase by comparing the performance counters of the previous epoch to the performance counters of an earlier epoch.

12. The system of claim 11, wherein the firmware/runtime is further configured to determine that the application is in a stable phase if the performance counters of the previous epoch are within a threshold distance from the performance counters of the earlier epoch.

13. The system of claim 10, wherein the firmware/runtime is further configured to determine whether the application is in a stable or unstable phase by comparing the predicted minimum operational voltage for the epoch with a predicted minimum operational voltage for the previous epoch.

14. The system of claim 13, wherein the firmware/runtime is further configured to determine that the application is in a stable phase if the predicted minimum operational voltage for the epoch is within a threshold distance from the predicted minimum operational voltage for the previous epoch.

15. The system of claim 10, wherein the firmware/runtime is further configured to detect errors in the execution that result from an undervoltage condition and to set the operating voltage of the microprocessor to be a nominal safe voltage, and wherein the microprocessor is configured to re-execute the epoch if an error is detected from an undervoltage condition.

16. The system of claim 10, wherein the epoch is a time-based epoch triggered by a predetermined period of time.

17. The system of claim 10, wherein the epoch is a function-based epoch triggered by individual function calls.

* * * * *

UNITED STATES PATENT AND TRADEMARK OFFICE
CERTIFICATE OF CORRECTION

PATENT NO. : 10,642,342 B2  
APPLICATION NO. : 16/108373  
DATED : May 5, 2020  
INVENTOR(S) : Bertran et al.

Page 1 of 1

It is certified that error appears in the above-identified patent and that said Letters Patent is hereby corrected as shown below:

On the Title Page

Item (12) and Item (72) Inventors: DELETE "Ramon Bertran, Bertran NY (US)" and INSERT --Ramon Bertran Monfort, New York, NY (US)--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*